US008479979B2

(12) United States Patent
Leeper et al.

(10) Patent No.: US 8,479,979 B2

(45) Date of Patent: Jul. 9, 2013

(54) MEDIA CASSETTE

(75) Inventors: Kevin Leeper, Angus (GB); Ken Peters, Dundee (GB)

(73) Assignee: NCR Corporation, Duluth, GA (US)

( * ) Notice: Subject to any disclaimer, the term of this patent is extended or adjusted under 35 U.S.C. 154(b) by 282 days.

(21) Appl. No.: 12/955,471

(22) Filed: Nov. 29, 2010

(65) Prior Publication Data

US 2012/0132654 A1 May 31, 2012

(51) Int. Cl.

*G06Q 40/00* (2012.01)
*G07D 11/00* (2006.01)
*G07F 19/00* (2006.01)

(52) U.S. Cl.

USPC ............................ 235/379; 235/375; 271/162

(58) Field of Classification Search

USPC 235/379, 375; 271/145, 162, 121–125; 902/8
See application file for complete search history.

(56) References Cited

U.S. PATENT DOCUMENTS

2007/0013124 A1 * 1/2007 Graef et al. .................. 271/145

* cited by examiner

*Primary Examiner* — Edwyn Labaze

(74) *Attorney, Agent, or Firm* — Paul W. Martin

(57) ABSTRACT

A media cassette comprises: a cassette body defining a picking end and a handle end opposite the picking end, and a removable lid coupled to the cassette body. The handle end includes an engagement portion. The removable lid defines a locking portion complementary to the engagement portion and configured to interlock therewith so that when the removable lid is removed and interlocked with the cassette body, the removable lid is maintained in an upright position and the cassette body is maintained at an angle to facilitate replenishment with media.

16 Claims, 5 Drawing Sheets

MEDIA CASSETTE

FIELD OF INVENTION

The present invention relates to improvements in or relating to a media cassette.

BACKGROUND OF INVENTION

Media cassettes are used to store media for dispensing from a self-service terminal. One common type of self-service terminal is an automated teller machine (ATM). An ATM includes media cassettes in the form of currency cassettes.

A typical currency cassette stores thousands of banknotes in a neat array. This neat array of banknotes is urged by a sprung plate towards a picking area to ensure that the neat array is maintained in contact with the picking area as banknotes are removed from the cassette.

To replenish the currency cassette with banknotes, the sprung plate is retracted and an array of new banknotes is placed between the retracted sprung plate and the picking area.

It is quite difficult for one person to retract the sprung plate and insert the array of new banknotes while holding the sprung plate in the retracted position.

Loading frames have been devised that maintain the currency cassette at an angle to facilitate loading of an array of new banknotes, but these loading frames are easily misplaced, and may not be located where currency cassette replenishment occurs (for example, in a cash-in-transit vehicle, in a retail establishment, or the like).

It would be desirable to provide an improved cassette that facilitates easy replenishment by one person.

SUMMARY OF INVENTION

Accordingly, the invention generally provides methods and apparatus for a media cassette including a lid and a cassette body, where the lid can support the cassette body at an angle to facilitate replenishment.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media cassette comprising:

a cassette body defining a picking end and a handle end opposite the picking end, the cassette body including an engagement portion;

a removable lid coupled to the cassette body and defining a locking portion complementary to the engagement portion and configured to interlock therewith so that when the removable lid is removed and interlocked with the cassette body, the removable lid is maintained in an upright position and the cassette body is maintained at an angle to the removable lid to facilitate replenishment with media.

The media cassette may comprise a currency cassette. The currency cassette may comprise a banknote cassette.

The engagement portion may be located near to the handle end so that the handle end is raised relative to the picking end when the removable lid is interlocked with the cassette body. Alternatively, the engagement portion may be located near to the picking end so that the picking end is raised relative to the handle end when the removable lid is interlocked with the cassette body.

The cassette body may include opposing long sidewalls extending between a short sidewall located at the picking end and an opposing short sidewall located at the handle end.

The engagement portion may be located at a lower portion of the handle end.

The cassette body may include a pair of engagement portions, each engagement portion located on one of the opposing long sidewalls at a lower portion of the handle end.

Each engagement portion may comprise a stub protruding from one of the long sidewalls.

Alternatively, each engagement portion may comprise a recess defined by one of the long sidewalls.

The removable lid may define opposing wings which, when the removable lid closes the cassette body, extend from the picking end to the handle end.

The removable lid may comprise a pair of locking portions.

Each locking portion may be located on one of the opposing wings.

Each locking portion may comprise a recess into which a corresponding stub (the engagement portion) from the cassette body can be inserted.

Alternatively, each locking portion may comprise a tine for insertion into a corresponding recess (the engagement portion) on the cassette body.

It should be appreciated that the engagement portions and the locking portions are configured with mutually complementary formations. It is not essential that a protruding part is on the cassette body and a recess is on the cassette lid, as the opposite configuration could be used. In some embodiments, one of the engagement portions may be a recess and the other engagement portion may be a protrusion; similarly, one of the locking portions may be a recess (corresponding to the protrusion on the cassette body) and the other locking portion may be a protrusion (corresponding to the recess on the cassette body).

The stubs (the engagement portions) may define a loading angle to a base of the cassette so that when the stubs are inserted into the recesses (the locking portions on the cassette lid) the cassette base is maintained at the loading angle to the cassette lid.

The opposing long sidewalls on the cassette body may each define a support bracket protruding therefrom, so that each wing from the cassette lid is located within the support bracket when the cassette lid is placed in a closed position (that is, when the cassette lid closes the cassette body). This provides additional strength to the wings to prevent the wings from being pulled outwards from the opposing long sidewalls of the cassette base.

The loading angle may be within the range of thirty degrees to sixty degrees. The loading angle may be within the range of forty degrees to fifty degrees. Maintaining the cassette body at the loading angle facilitates replenishment of the cassette body because it is easier to insert the new banknotes and to maintain them in a neat array when the cassette body is tilted.

According to a second aspect there is provided a method of loading a media cassette, the method comprising:

completely removing a cassette lid from a cassette body;

coupling the cassette lid to the cassette body so that the cassette lid is upstanding and the cassette body is maintained by the cassette lid at an angle to the cassette lid;

retracting a sprung plate within the cassette body; and loading media items into the cassette body.

The method may further comprise, releasing the sprung plate to urge the loaded media items towards a picking end of the media cassette.

The cassette lid may be coupled to the cassette body at a handle end of the cassette body. Alternatively, the cassette lid may be coupled to the cassette body at a picking end of the cassette body.

These and other aspects will be apparent from the following specific description, given by way of example, with reference to the accompanying drawings.

Figure 1:
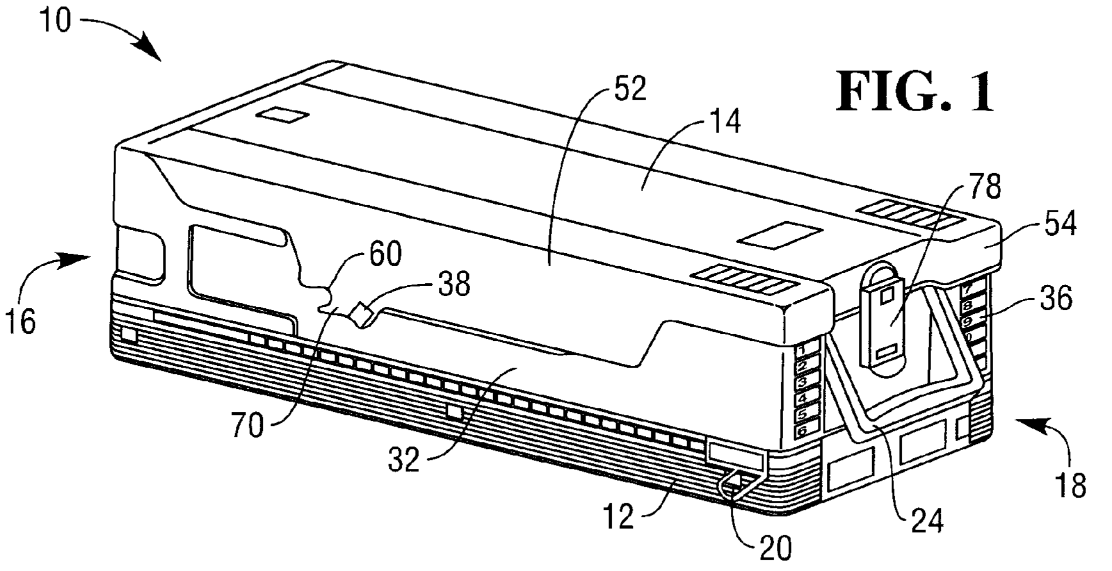
FIG. 1 is a perspective view of a media cassette in a closed position, according to one embodiment of the present invention.
Figure 2:
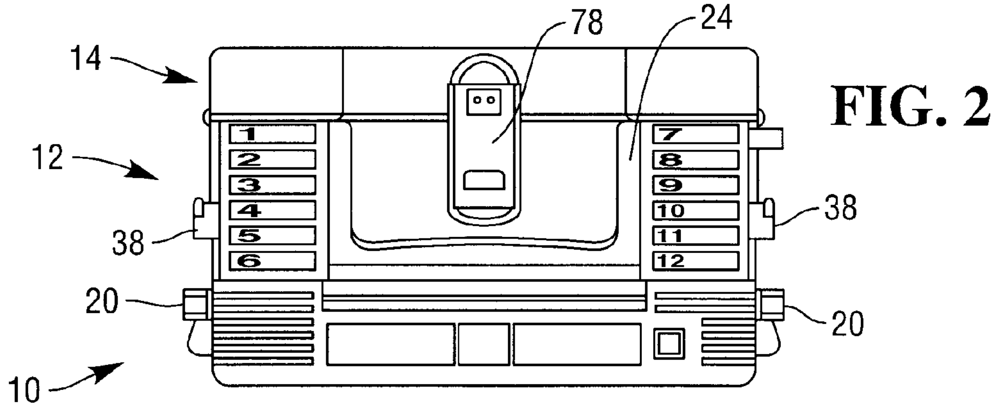
FIG. 2 is an end view of the cassette of FIG. 1.

It should be appreciated that the drawings provided are based on computer renderings from which actual physical embodiments can be produced. As such, some of these drawings contain intricate details that are not essential for an understanding of these embodiments but will convey useful information to one of skill in the art. Therefore, not all parts shown in the drawings will be referenced specifically. Furthermore, to aid clarity and to avoid numerous leader lines from cluttering the drawings, not all reference numerals will be shown in all of the drawings. In addition, some of the features may be removed from some views to further aid clarity.

DETAILED DESCRIPTION

Referring to the drawings, there is shown a media cassette 10 in the form of a currency cassette.

The currency cassette 10 comprises a cassette body 12 and a removable cassette lid 14 coupled to the cassette body 12.

The currency cassette 10 is shown in a closed position (that is, with the removable cassette lid 14 closing the cassette body 12) in FIGS. 1 to 4.

The cassette body 12 defines a picking end 16 and a handle end 18 opposite the picking end 16. The handle end 18 includes a pair of engagement portions 20 located at a lower portion of the handle end 18.

Figure 3:
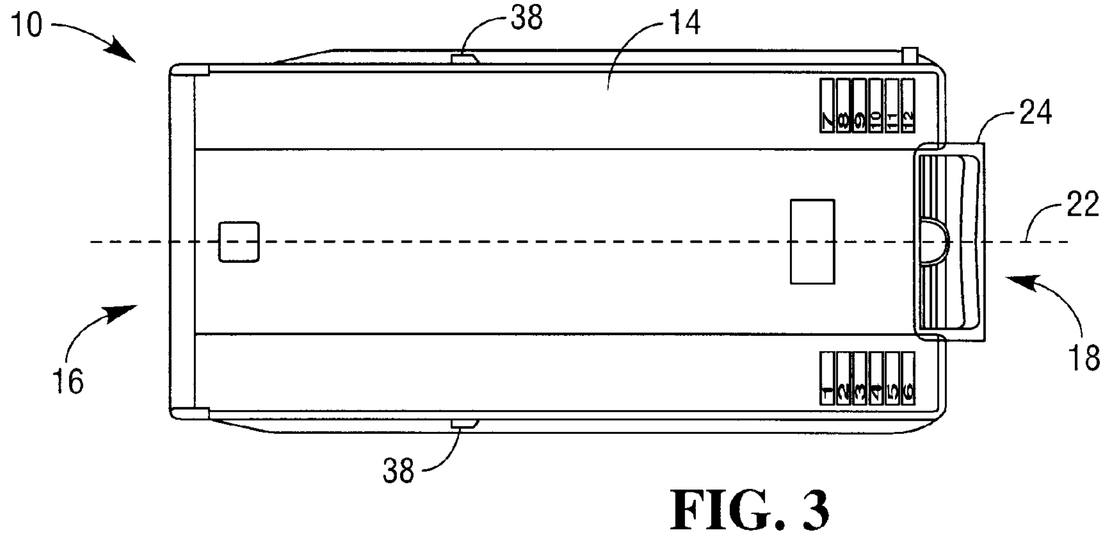
FIG. 3 is a plan view of the cassette of FIG. 1
Figure 4:
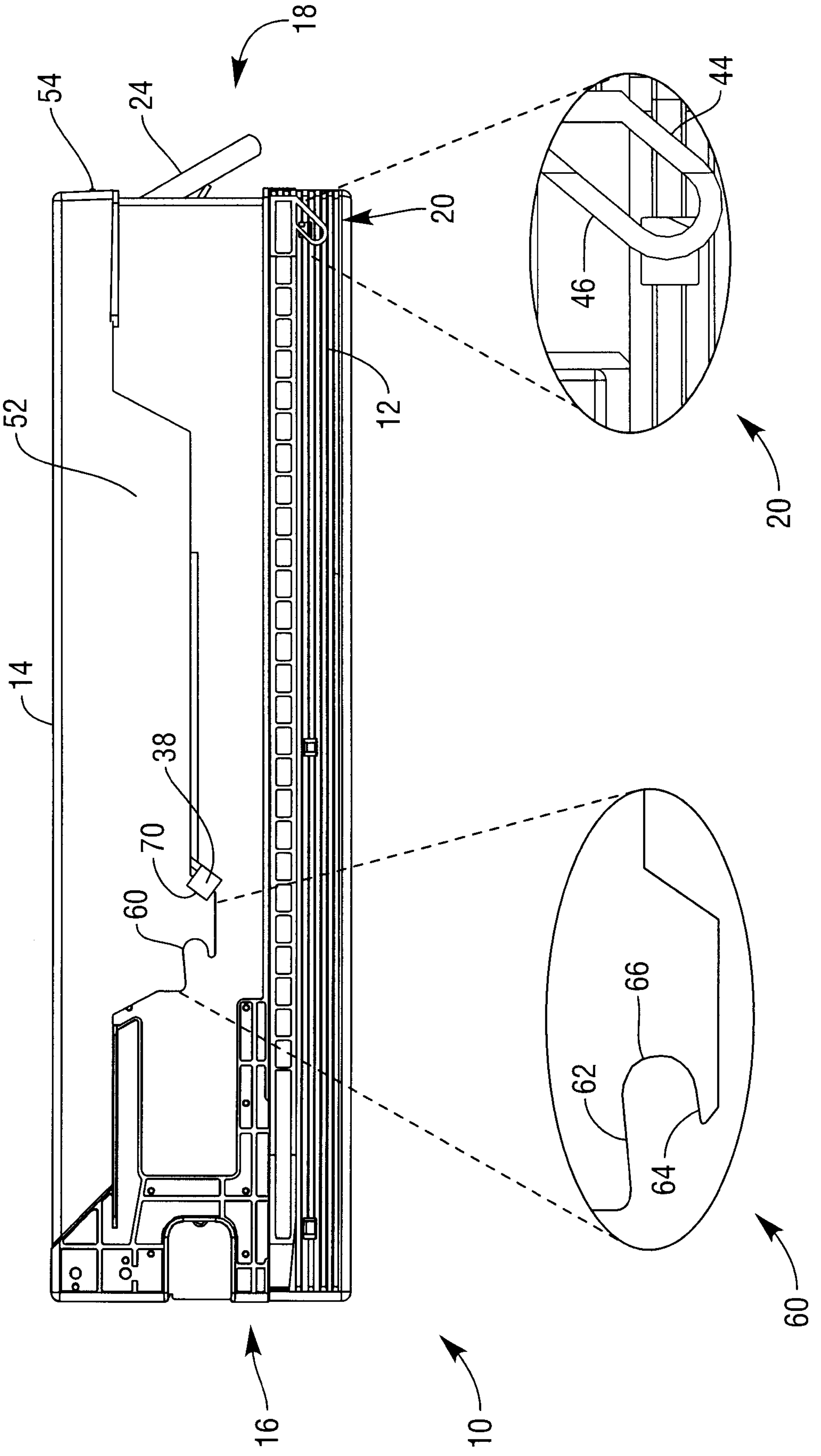
FIG. 4 is a side view of the cassette of FIG. 1.

The cassette body 12 defines a longitudinal axis, illustrated in FIG. 3 by broken line 22, and includes a handle 24 at the handle end 18.

The cassette body 12 also comprises: a base 30 (best seen in FIG. 7), opposing long sidewalls 32 upstanding from the base 30 and extending from the picking end 16 to the handle end 18, a (short) pick end sidewall 34 and a (short) handle end sidewall 36.

Each of the long sidewalls 32 defines a U-shaped (in cross-section) support bracket 38 located generally centrally on the sidewall 32 (but nearer the picking end 16 than the handle end 18), and protruding therefrom The cassette body 12 also includes a sprung plate 40 coupled to a ratchet (not shown). The sprung plate 40 moves along the longitudinal axis 22 and urges any banknotes inserted between the sprung plate 40 and the picking end 16 towards the pick end sidewall 34.

The cassette body 12 defines a replenishment aperture 42 between the long sidewalls 32, the pick end sidewall 34, and the handle end sidewall 36. This replenishment aperture 42 is approximately the same size (area) as the base 30, and is completely covered by the removable cassette lid 14 when the removable cassette lid 14 is in the closed position. The replenishment aperture 42 is used to remove banknotes from, and add banknotes to, the cassette body 12.

The engagement portions 20 are in the form of stubs protruding laterally from the long sidewalls 32. Each stub 20 includes a front edge 44 and a rear edge 46 (best seen in the second enlarged portion of FIG. 4). In this embodiment, the front edge 44 is angled at approximately fifty degrees relative to the base 30 (the loading angle).

The removable cassette lid 14 comprises a plate surface 50 having a surface area approximately the same as the surface area of the base 30. The plate surface 50 has opposing wings 52 extending therefrom, and a coupling wall 54 extending between the opposing wings 52. The opposing wings 52 are dimensioned to overlap the long sidewalls 32.

Each of the opposing wings 52 defines a locking portion 60 which is complementary to the stub 20. Each locking portion 60 is in the form of a recess defined by its associated wing 52. The recess 60 is generally U-shaped, and comprises an upper edge 62 generally parallel to the plate surface 50, and a lower edge 64 connected to the upper edge 62 by a curved edge 66 (best seen in the first enlarged portion of FIG. 4).

Each of the opposing wings 52 also defines a heel portion 70 near the recess 60.

Figure 7:
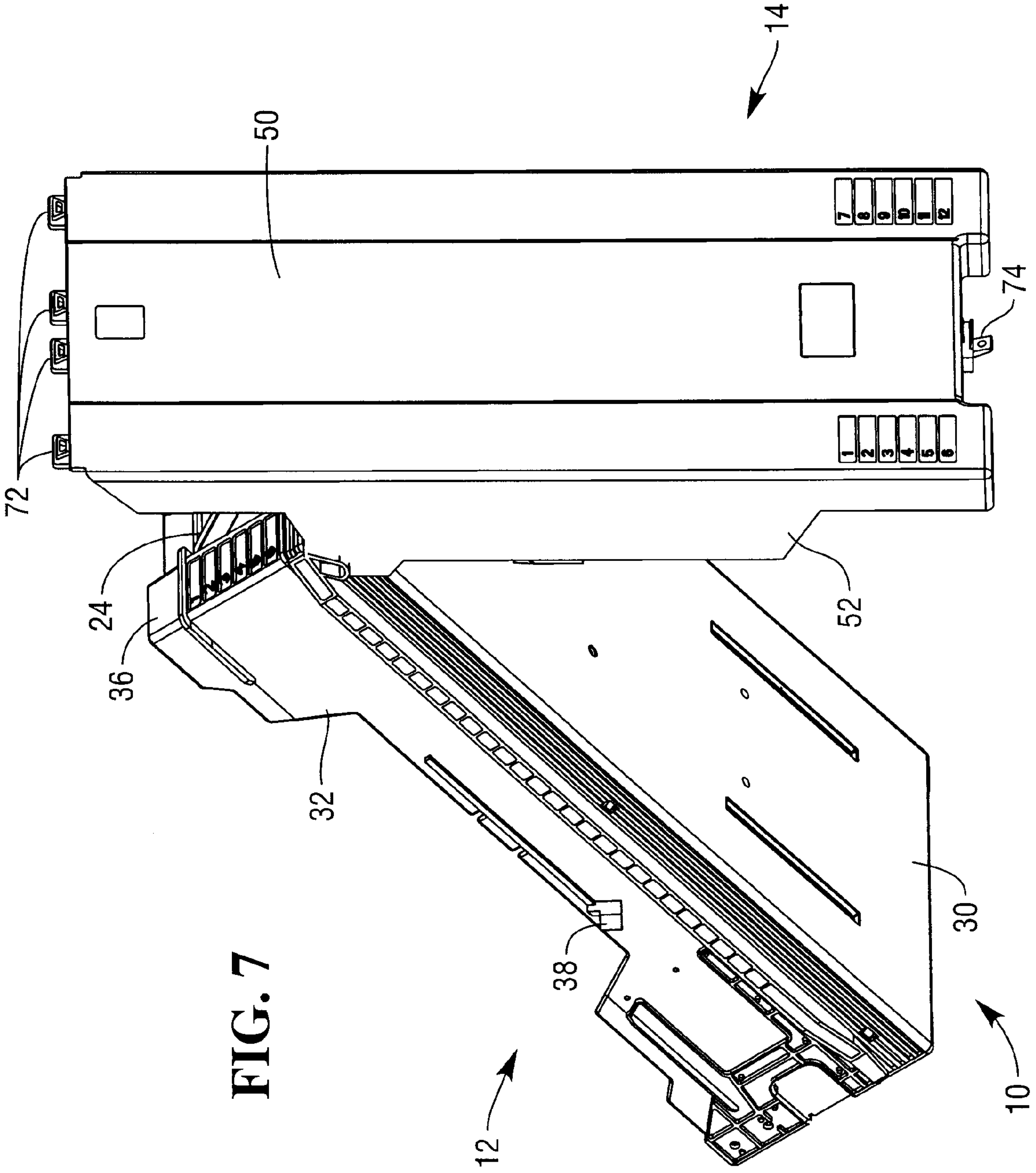
FIG. 7 is a perspective view of the cassette of FIG. 1 in the loading position.

The removable cassette lid 14 further comprises a set of tabs 72 extending from the plate surface 50 at an end opposite the coupling wall 54, and a latch fixing 74 located on the coupling wall 54 (best seen in FIG. 7).

The cassette body 12 defines tab recesses 76 (best seen in FIG. 5) at the picking end 16 complementary to the set of tabs 72, and a latch 78 (best seen in FIG. 2) mounted at the handle end 18 for coupling to the latch fixing 74 on the removable lid 14.

To put the cassette 10 into the closed position (see FIGS. 1 to 4), the removable cassette lid 14 is coupled to the cassette body 12 as follows. The set of tabs 72 on the cassette lid 14 are slid into the tab recesses 76 in the cassette body 12, and the cassette lid 14 is lowered until the wings 52 partially overlap the sidewalls 32, the heel portions 70 locate within the U-shaped support brackets 38, and the coupling wall 54 partially overlaps the handle end sidewall 36. The latch 78 can then be coupled to the latch fixing 74 to secure the removable cassette lid 14 onto the cassette body 12.

Figure 6:
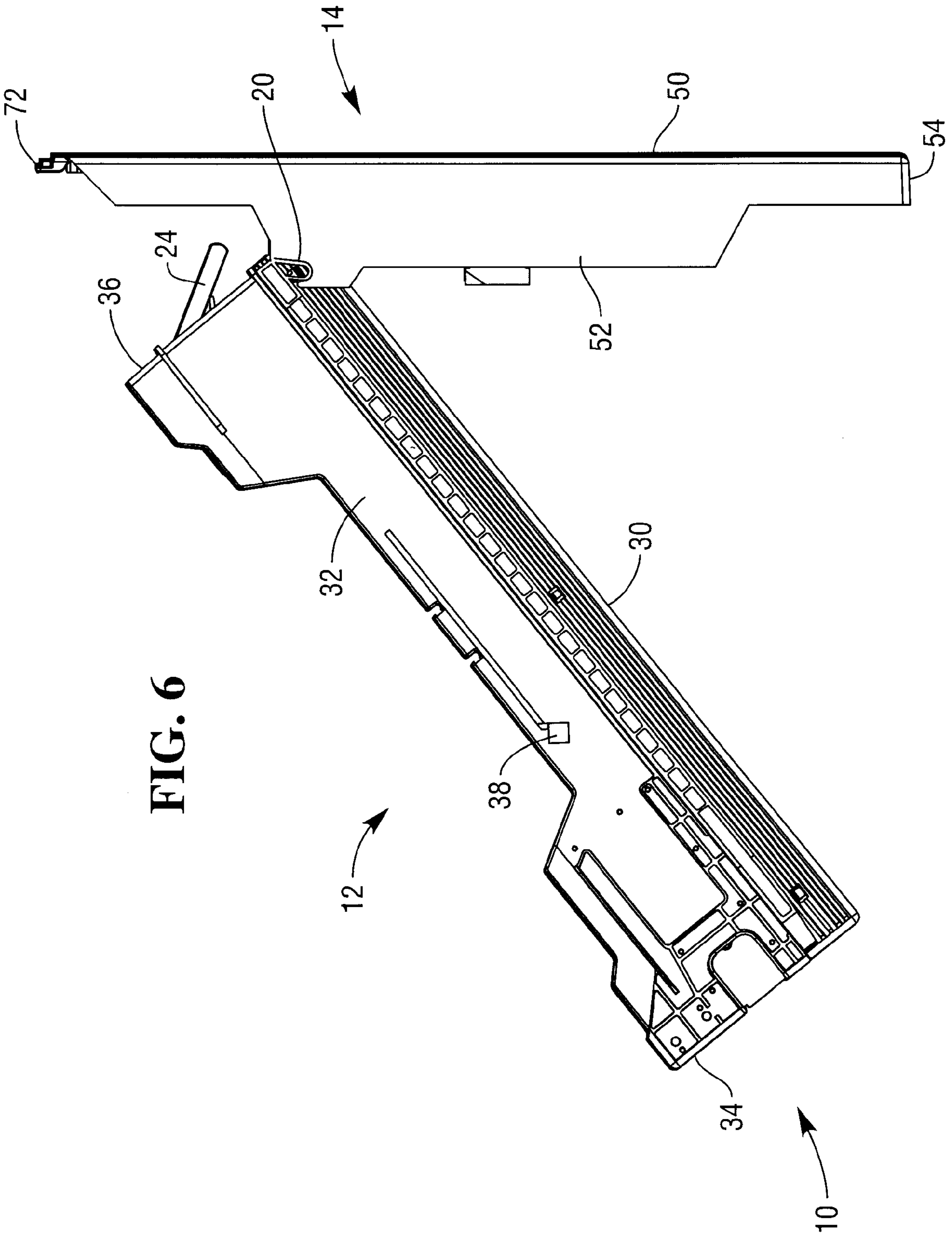
FIG. 6 is a side view of the cassette of FIG. 1 in the loading position.

To replenish the cassette 10, the cassette lid 14 is removed and coupled to the cassette body 12 as shown in FIGS. 6 and 7 to position the cassette 10 in a loading position.

Once the cassette lid 14 has been removed, the cassette lid 14 is placed so that it is supported by its coupling wall 54 (that is, it is standing on its coupling wall 54).

Figure 5:
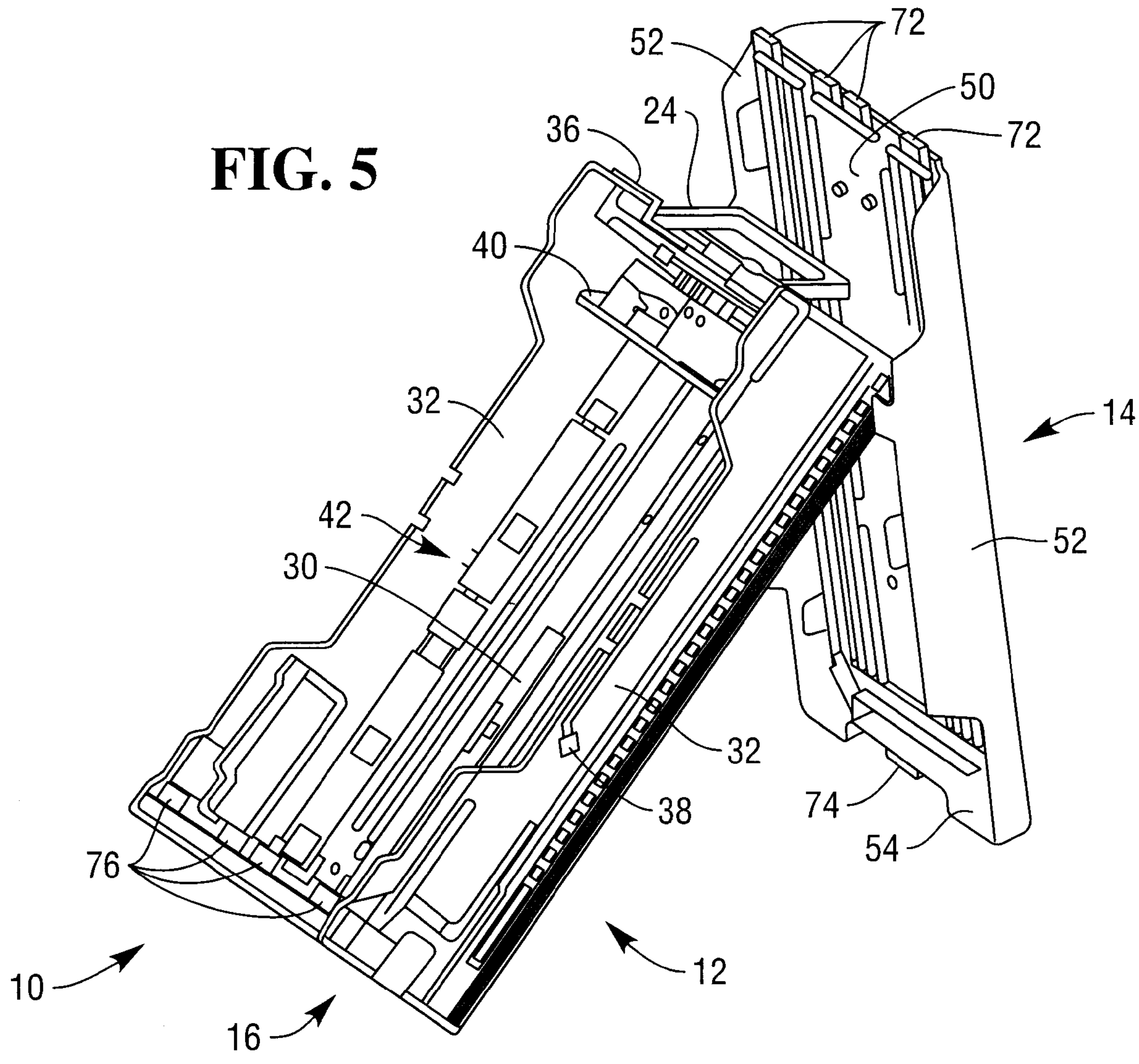
FIG. 5 is a perspective view of the cassette of FIG. 1 partway towards a loading position.

The cassette body 12 is then tilted so that its handle end 18 is raised and the stubs 20 are inserted into the respective recesses 60 (locking portions) of the cassette lid 14. FIG. 5 illustrates one stub 20 inserted into one of the recesses 60 and the other stub 20 being aligned for insertion into the other recess 60.

When both stubs 20 have been inserted into the corresponding recesses 60, the cassette body 12 is maintained securely in the loading position. In this embodiment, when the cassette body 12 is in the loading position, the base 30 is at an angle of approximately fifty degrees to the horizontal and forty degrees to the vertical. This facilitates replenishment operations because it is easier to insert a neat array of banknotes into a currency cassette that is tilted than into a horizontal currency cassette.

Once the currency cassette 10 has been replenished with banknotes, the cassette body 12 can be removed from the cassette lid 14, and the cassette lid 14 can be coupled to the cassette body 12 to put the cassette 10 into the closed position for transport to an automated teller machine (ATM).

When in the closed position, the U-shaped support brackets 38 hold the heel portions 70 in place to prevent the sidewalls 32 from deflecting outwards.

Various modifications may be made to the above described embodiment within the scope of the invention, for example, in other embodiments, the media cassette may store coupons, passes, tickets, stamps, or the like.

In other embodiments, the engagement portions and the locking portions may be configured differently to the configuration described above.

In other embodiments, one of the engagement portions may be a recess and the other engagement portion may be a protrusion; similarly, one of the locking portions may be a recess (corresponding to the protrusion on the cassette body) and the other locking portion may be a protrusion (corresponding to the recess on the cassette body).

In other embodiments, each engagement portion may comprise a recess and each locking portion may comprise a protrusion.

In other embodiments, the loading angle may be greater or smaller than fifty degrees.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A media cassette comprising:

a cassette body defining a picking end and a handle end opposite the picking end, the cassette body including an engagement portion; and a lid to the cassette body separable from the cassette body and defining a locking portion complementary to the engagement portion and configured to interlock therewith so that when the lid is separated from the cassette body and then interlocked with the cassette body, the lid is maintained in an upright position and the cassette body is maintained at an angle to the lid to facilitate replenishment with media.

2. A media cassette according to claim 1, wherein the media cassette comprises a currency cassette.

3. A media cassette according to claim 1, wherein the cassette body includes opposing long sidewalls extending between a short sidewall located at the picking end and an opposing short sidewall located at the handle end.

4. A media cassette according to claim 3, wherein the opposing long sidewalls on the cassette body may each define a support bracket protruding therefrom and the lid defines opposing wings which, when the lid closes the cassette body, extend from the picking end to the handle end, so that each wing from the lid is located within the support bracket when the lid is placed in a closed position.

5. A media cassette according to claim 1, wherein the engagement portion is located at a lower portion of the handle end.

6. A media cassette according to claim 1, wherein the cassette body includes a pair of engagement portions, each engagement portion located on one of the opposing long sidewalls at a lower portion of the handle end.

7. A media cassette according to claim 6, wherein each engagement portion comprises a stub protruding from one of the long sidewalls.

8. A media cassette according to claim 7, wherein each locking portion comprises a recess into which a corresponding stub from the cassette body can be inserted.

9. A media cassette according to claim 7, wherein the engagement portions define a loading angle to a base of the cassette so that when the engagement portions are inserted into the locking portions on the lid, the cassette body is maintained at the loading angle to the cassette lid.

10. A media cassette according to claim 6, wherein each engagement portion comprises a recess defined by one of the long sidewalls.

11. A media cassette according to claim 1, wherein the lid defines opposing wings which, when the lid closes the cassette body, extend from the picking end to the handle end.

12. A media cassette according to claim 11, wherein the lid comprises a pair of locking portions.

13. A media cassette according to claim 12, wherein each locking portion is located on one of the opposing wings.

14. A media cassette according to claim 1, wherein each locking portion comprises a tine for insertion into the engagement portion on the cassette body.

15. A method of loading a media cassette, the method comprising:

separating a cassette lid from a cassette body;

coupling the cassette lid to the cassette body so that the cassette lid is upstanding and the cassette body is maintained by the cassette lid at an angle to the cassette lid;

retracting a sprung plate within the cassette body; and loading media items into the cassette body.

16. A media cassette comprising:

a cassette body defining a picking end and a handle end opposite the picking end, the cassette body including a short sidewall located at the picking end, and an opposing short sidewall located at the handle end, opposing long sidewalls extending between the short sidewall at the picking end and the opposing short sidewall at the handle end, and an engagement portion; and a removable lid coupled to the cassette body and defining a locking portion complementary to the engagement portion and configured to interlock therewith so that when the removable lid is removed and interlocked with the cassette body, the removable lid is maintained in an upright position and the cassette body is maintained at an angle to the removable lid to facilitate replenishment with media;

wherein the opposing long sidewalls on the cassette body each define a support bracket protruding therefrom and the removable lid defines opposing wings which, when the removable lid closes the cassette body, extend from the picking end to the handle end, so that each wing from the cassette lid is located within the support bracket when the cassette lid is placed in a closed position.

* * * * *